United States Patent
Szász et al.

(10) Patent No.: US 11,652,865 B2
(45) Date of Patent: May 16, 2023

(54) METHODS, APPARATUS AND COMPUTER-READABLE MEDIA RELATING TO QUALITY OF MEDIA STREAMS TRANSMITTED OVER A NETWORK

(71) Applicant: Telefonaktiebolaget LM Ericsson (PUBL), Stockholm (SE)

(72) Inventors: Ferenc Szász, Budapest (HU); Attila Bäder, Paty (HU); Attila Mitcsenkov, Budapest (HU); Istvan Gelle, Veroce (HU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/619,651

(22) PCT Filed: Jun. 26, 2019

(86) PCT No.: PCT/EP2019/067062
§ 371 (c)(1),
(2) Date: Dec. 16, 2021

(87) PCT Pub. No.: WO2020/259831
PCT Pub. Date: Dec. 30, 2020

(65) Prior Publication Data
US 2022/0303332 A1  Sep. 22, 2022

(51) Int. Cl.
| | | |
|---|---|---|
| *G06F 13/00* | (2006.01) | |
| *H04L 65/80* | (2022.01) | |
| *H04L 65/61* | (2022.01) | |
| *H04L 65/65* | (2022.01) | |

(52) U.S. Cl.
CPC ............. *H04L 65/80* (2013.01); *H04L 65/61* (2022.05); *H04L 65/65* (2022.05)

(58) Field of Classification Search
CPC ......... H04L 65/80; H04L 65/61; H04L 65/65; H04M 3/2227; H04W 28/0236
USPC .... 709/231, 230, 224, 217–219; 706/12, 13, 706/14, 15, 16, 21; 703/2, 13, 17
See application file for complete search history.

(56) References Cited

U.S. PATENT DOCUMENTS

| | | | |
|---|---|---|---|
| 10,326,879 B1 | 6/2019 | Makagon et al. | |
| 10,924,393 B2* | 2/2021 | Vasseur | H04L 47/2425 |
| 2020/0389390 A1* | 12/2020 | Vasseur | H04L 47/724 |
| 2022/0191562 A1* | 6/2022 | Mishra | H04N 21/251 |

FOREIGN PATENT DOCUMENTS

WO    2019 101193 A1    5/2019

OTHER PUBLICATIONS

PCT International Search Report issued for International application No. PCT/EP2019/067062—dated Dec. 16, 2019.
PCT Written Opinion of the International Searching Authority issued for International application No. PCT/EP2019/067062—dated Dec. 16, 2019.

* cited by examiner

*Primary Examiner* — Kenneth R Coulter
(74) *Attorney, Agent, or Firm* — Baker Botts L.L.P.

(57) ABSTRACT

A method for determining the quality of a media stream transmitted via a communication network, including at least the quality of the media stream as it is transmitted via a radio access network to a receiving device, based on data which is obtained prior to that transmission via the radio access network. The method utilizes a predictive model which is developed using a machine-learning algorithm.

19 Claims, 6 Drawing Sheets

METHODS, APPARATUS AND COMPUTER-READABLE MEDIA RELATING TO QUALITY OF MEDIA STREAMS TRANSMITTED OVER A NETWORK

PRIORITY

This nonprovisional application is a U.S. National Stage Filing under 35 U.S.C. § 371 of International Patent Application Serial No. PCT/EP2019/067062 filed Jun. 26, 2019 and entitled "METHODS, APPARATUS AND COMPUTER-READABLE MEDIA RELATING TO QUALITY OF MEDIA STREAMS TRANSMITTED OVER A NETWORK" which is hereby incorporated by reference in its entirety.

TECHNICAL FIELD

Embodiments of the present disclosure relate to media streams transmitted over a network, and particularly to methods, apparatus and computer-readable media for monitoring the quality of media streams transmitted over a network.

BACKGROUND

Adaptive bitrate technology is used both in the internet and in mobile networks for streaming voice and video traffic. In such networks the available bandwidth, transport and radio quality can change during the session and adaptive bitrate technology is used to adapt the transmission of the media stream to these changes promptly. The adaptive bitrate technologies used today ensure efficient use of the available radio and transport resources, attempting to provide the best possible media quality in the given transmission conditions.

Adaptive bitrate technologies require a codec which can encode media content at multiple bitrates. Examples for adaptive multi-rate encoding used in mobile networks are Adaptive Multi-Rate (AMR) and Enhanced Voice Services (EVS) for voice, and H.264 for video.

The clients (streaming or sending client and receiver client) negotiate the possible encoding and bit rates by signaling in the session setup. The receiver client continuously measures channel quality and requests changes to the bitrate accordingly. In the case of good radio conditions, clients may use the maximum possible bitrate, which offers the best possible voice or video quality. In the case of unfavorable radio conditions, the bitrate of the encoded media may be decreased. Lower bitrate encoding contains relatively more error correction bits, and therefore they are more robust at the cost of lower average voice or video quality.

For transporting streaming media (audio and video) over Internet Protocol (IP) networks, the Real-time Transport Protocol (RTP) (RFC 3550 https://tools.ietf.org/html/rfc3550) was developed by the Internet Engineering Task Force (IETF). RTP is used in 4G mobile networks for voice and video telephony (Voice over Long Term Evolution (VoLTE), Video over Long Term Evolution (ViLTE), Voice over WiFi). RTP is expected to be used in 5G networks as well for the same purpose. RTP uses User Datagram Protocol (UDP)/IP transport protocols, which provide connectionless, unreliable transport service. These transport protocols do not contain any mechanism for resending erroneous or lost packets (as opposed to e.g. Transmission Control Protocol (TCP)/IP transport).

RTP can be used in conjunction with the RTP Control Protocol (RTCP). While RTP carries the media streams (e.g., audio and video), RTCP is used to monitor transmission statistics and quality of service (QoS) of the media streams.

Mobile network operators typically monitor the RTP/RTCP traffic to ensure quality of service of the media streams. This is especially important in mobile networks, because the transmission path from sender to receiver includes one or more radio or wireless links, in which the packet loss and other quality degradations are typically higher than in the wired network parts. The number of monitored audio streams in a mobile network is high and monitored by high capacity traffic probes at the gateway nodes, where all streams are available. One possible method for monitoring the media streams is to capture the RTP/RTCP packets with network probes at the core network.

RTCP provides statistics such as loss, jitter and delay of the media stream between the sender and receiver nodes. By capturing RTCP in the core network, the quality of the media stream can be adequately monitored. However, RTCP is an optional protocol extension and many important terminal vendors do not use or implement RTCP.

An alternative mechanism for monitoring the quality of a media stream is therefore required.

SUMMARY

It is not feasible to monitor the media quality at the terminal or the receiver client owing to the large number of subscribers. One possible mechanism for monitoring the quality of a media stream is to capture the media data itself (e.g., the RTP traffic) in the core network node, prior to its transmission via the radio access network to the terminal device. However, this has the following limitations:

Since the packets are captured in the core, any loss or degradation in the downlink radio access network is not considered. In mobile networks the radio interface is usually the most important source for service degradation.

In the case of RTP, it is not possible to determine the end-to-end packet delay, which is also a significant factor for determining the voice or video quality experienced by the end users.

It is known to overcome these problems by monitoring the quality of the radio network separately and correlating radio events with those reported by the core network probe. However, these methods are complex to implement and, as the quality of the radio network can only be monitored imprecisely, provide inaccurate results.

According to a first aspect of the disclosure, there is provided a method performed by a node of a communications network, for monitoring the quality of one or more media streams transmitted over the communication network. The communications network comprises a radio access network and a core network. The method comprises: obtaining first values for one or more first quality parameters of a media stream. The media stream is transmitted from a sending device to a terminal device via at least the core network and the radio access network. The first values are measured by a core network node of the core network monitoring the media stream prior to transmission of the media stream to the terminal device via the radio access network. The method further comprises: applying a model trained using a machine-learning algorithm to the first values; and obtaining, from the model, second values for one or more second quality parameters of the media stream. The second values are representative of the quality of the media stream at least as transmitted via the radio access network.

Machine-readable mediums and apparatus are also provided for performing the method recited above. For example, in one aspect, there is provided a node for a communications network, configured to monitor the quality of one or more media streams transmitted over the communication network. The communications network comprises a radio access network and a core network. The node comprises processing circuitry and a computer-readable medium comprising instructions which, when executed by the processing circuitry, cause the node to: obtain first values for one or more first quality parameters of a media stream. The media stream is transmitted from a sending device to a terminal device via at least the core network and the radio access network. The first values are measured by a core network node of the core network monitoring the media stream prior to transmission of the media stream to the terminal device via the radio access network. The node is further caused to: apply a model trained using a machine-learning algorithm to the first values; and obtain, from the model, second values for one or more second quality parameters of the media stream, the second values being representative of the quality of the media stream at least as transmitted via the radio access network.

Embodiments of the disclosure provide a solution to the problem of monitoring the quality of a media stream transmitted via a communication network. The methods do not require additional signaling, as in certain embodiments the model is trained using existing RTCP signaling. Further, embodiments of the disclosure do not entail the complexity of methods which monitor radio access networks separately and correlate radio access network events with the quality of the media streams.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
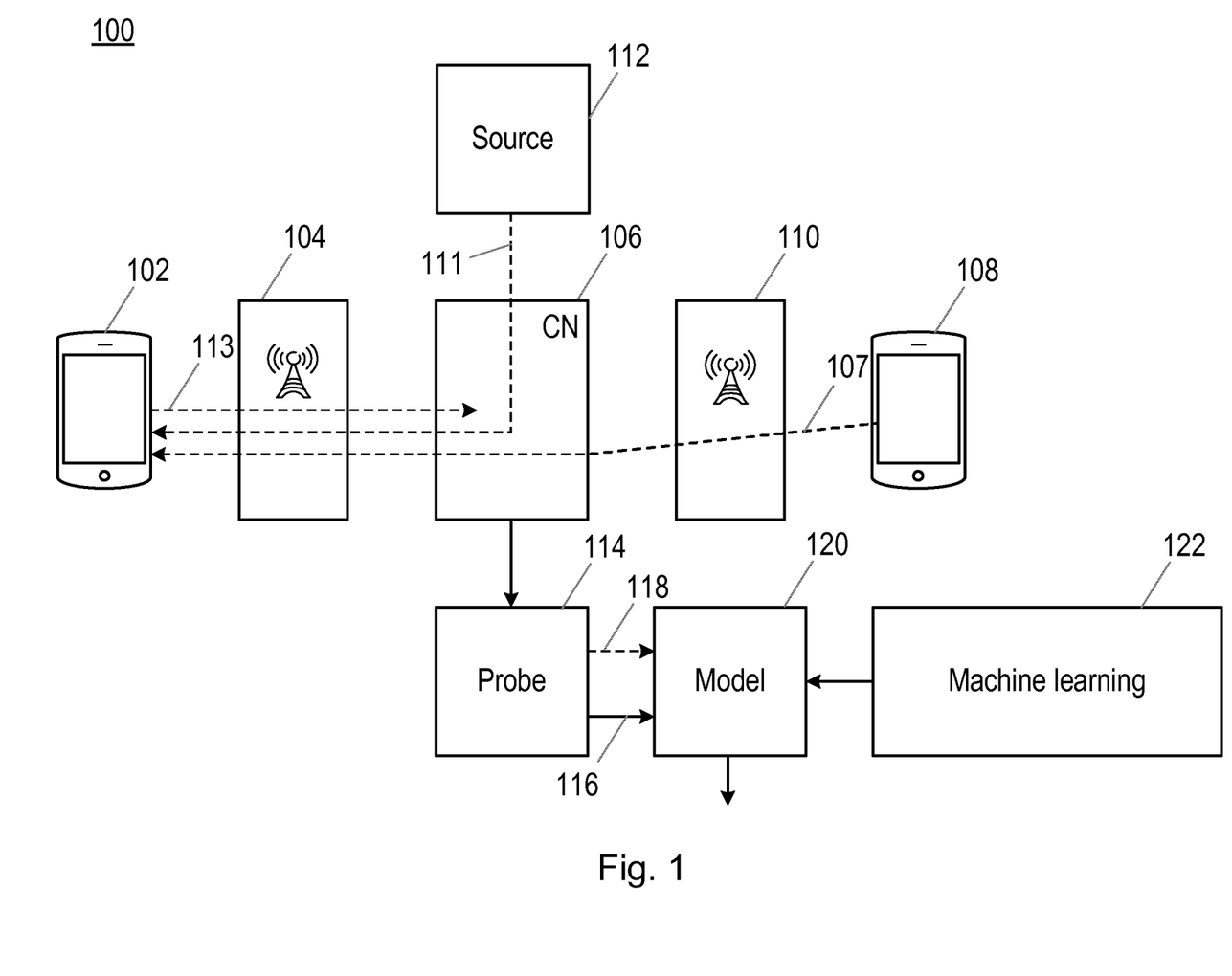
FIG. 1 is a schematic diagram showing a communication network according to embodiments of the disclosure.

FIG. 1 is a schematic diagram showing a communication network 100 according to embodiments of the disclosure.

The network 100 comprises a receiving wireless device (e.g., a mobile station (STA), a user equipment (UE), etc) 102, a first radio access network 104 and a core network 106. One or more media streams are routed to the receiving wireless device 102 via the core network 106 and the first radio access network 104.

Those skilled in the art will appreciate that various devices may from the sources of those media streams. FIG. 1 shows two possibilities.

In the illustrated embodiment, the network 100 comprises a second, source wireless device (e.g., a UE, a STA, etc) 108 and a second radio access network 110. The source wireless device 108 is coupled to the core network 106 via the second radio access network 110. In this arrangement, the source wireless device 108 may act as a source of media for the first wireless device, for example, during a voice or video call. Thus a media stream 107 originates at the source wireless device 108 and terminates at the receiving wireless device 102, passing via the second radio access network 110, the core network 106 and the first radio access network 104. It will be appreciated that the media stream 107 may alternatively originate in a wired device, in which case the second radio access network 110 will not be present in the communication path of the media stream 107.

Media streams to the receiving wireless device 102 may alternatively or additionally originate in a source media server. For example, the receiving wireless device 102 may stream a video from a streaming service such as Netflix, Amazon Video, etc, or an audio stream (e.g., a podcast, etc). Thus, in the illustrated embodiment, the network 100 further comprises a media source server 112 coupled to the core network 106. A second media stream 111 originates in the media source server 112 and terminates at the receiving wireless device 102, passing via the core network 106 and the first radio access network 104.

For example, the media streams 107, 111 may utilize Voice over Internet Protocol (Vol P), Voice over Long Term Evolution (VoLTE) or Video over LTE (ViLTE).

The network 100 may implement any suitable telecommunication standards to provide service to the receiving wireless device 102 and to facilitate transmission of the media stream. For example, the network 100 may comprise a cellular network, such as those conforming to one or more of the telecommunications standards set by the $3^{rd}$ Generation Partnership Project (3GPP), e.g., Global System for Mobile Communication (GSM) and related 2G standards, Universal Mobile Telecommunications System (UMTS) and related 3G standards, Long Term Evolution (LTE) and related 4G standards, and New Radio (NR) and the developing 5G standards. In cellular networks, the radio access networks 104, 110 comprise one or more base stations (e.g., NodeBs, eNodeBs, gNodeBs, etc) providing service to wireless devices arranged in one or more cells. Alternatively or additionally, the network 100 may implement non-cellular radio technologies, such as IEEE 802.11 and wireless local area networks. In such networks, the radio access networks comprise one or more wireless access points which provide service to one or more mobile stations (STAs).

In embodiments of the disclosure, the media streams 107, 111 are transmitted using adaptive bitrate streaming, and particularly utilize a transport-layer protocol which does not comprise any mechanism for retransmitting erroneous or missing data packets. For example, in one embodiment, the media streams utilize real-time transport protocol (which is an application-layer protocol), which itself uses the UDP/IP transport-layer protocol. UDP/IP provides checksums for data integrity but provides no handshaking dialogues designed to re-transmit erroneous or missing packets. There is no guarantee of delivery, ordering, or duplicate protection. Other transport-layer protocols may similarly lack any mechanism for re-transmitting missing or erroneous packets. Thus the media streams 107, 111 are subject to unreliability in their respective communication paths which will affect the overall quality of the media streams as perceived by the end user.

Adaptive bitrate streaming utilizes an encoder which encodes a single source media at multiple bitrates. The receiving wireless device 102 is made aware of the available streams at differing bitrates and segments of the streams by a manifest file. The receiving wireless device 102 selects segments at the start of downloading a stream (usually from a lower-bitrate stream). If the available download speed is greater than the bitrate of the currently selected stream, the receiving wireless device 102 may select segments from higher-bitrate streams. Similarly, if the available download speed is lower than the bitrate of the currently selected stream, the receiving wireless device 102 may select segments from lower-bitrate streams (assuming that a lower-bitrate stream is available).

Lower-bitrate streams have a lower quality, but comprise relatively more error correction bits, and therefore they are more robust than higher-bitrate streams. A lower-bitrate stream may therefore provide a higher perceived quality at the receiving wireless device 102 than a higher-bitrate stream, when the media stream is transmitted in poor network conditions. The currently requested bitrate is not therefore a good indicator of the perceived quality of the media stream. The interaction of adaptive bitrate and MOS (as well as other quality parameters) according to one example is shown below in FIGS. 5 to 9.

The perceived quality of the media stream (also known as the quality of experience) may be represented by a parameter such as the mean opinion score (MOS). This is a well-known industry measure of the perceived quality of a media stream as rated by a user. The MOS itself comprises a rating between 1 (for bad quality) and 5 (for excellent quality), and is usually calculated as the arithmetic mean of a plurality of ratings obtained from individuals asked to rate the quality of their media streams. Algorithmic methods have been developed to estimate the MOS based on one or more measurable technical parameters, such as jitter, packet loss and delay. More detail on this aspect can be found in the discussion of FIG. 2 below. Of course, alternative measures (and alternative scales, instead of 1-5) may be used for the perceived quality.

As noted above, it is a non-trivial task to monitor the quality of the media streams 107, 111 transmitted via the communication network 100.

The requested bitrate of the adaptive bitrate media stream is not a good indicator of the quality of the media stream as perceived by the user.

One possible method for monitoring the media streams 107, 111 is to capture RTCP packets with network probes at the core network. RTCP provides statistics such as loss, jitter and delay of the media stream between the sender and receiver nodes (and these parameters can be converted to MOS as described above). However, RTCP is an optional protocol extension and many important terminal vendors do not use or implement RTCP.

Monitoring the packets of the media streams 107, 111 in the core network 106 before they are transmitted via the first radio access network 104 does not provide any information on packet loss or degradation in the radio access network 104, and this is usually the dominant source for service degradation. In the case of RTP, it is also not possible to determine the end-to-end packet delay, which is a significant factor for determining the voice or video quality experienced by the end users.

According to embodiments of the disclosure, one or more quality parameters of the media streams 107, 111 are monitored in the core network (e.g., by a core network node) prior to their transmission to the receiving wireless device 102 via the radio access network 104. The measured values for these quality parameters are representative of the quality of the media streams 107, 111 along their respective communication paths from their respective sources 108, 112, as far as the core network 106, but not including the first radio access network 104. The measured values are provided as inputs to a model trained using a machine-learning algorithm, which outputs values for quality parameters of the media streams 107, 111 including at least the first radio access network 104. In one embodiment, the model outputs values for quality parameters of the media streams 107, 111 along their entire communication paths (e.g., from the sources 108, 112 to the receiving wireless device 102).

The communication network 100 thus includes a probe 114 which is coupled to, or provided within, the core network 106. The probe 114 is operative to monitor the media streams 107, 111 in the core network 106, prior to their transmission via the first radio access network 104, and measure values for one or more quality parameters, such as the packet loss, the jitter and the bitrate (i.e., the requested bitrate for adaptive bitrate streaming, or codec bitrate).

The measured values 116 are output by the probe 114 to a model 120 trained using a machine-learning algorithm 122. Further detail regarding this aspect is provided below with respect to FIGS. 3 and 4. The model 120 may be implemented within the probe 114, or may be implemented in another node and operative to receive data from the probe 114. The machine-learning algorithm 122 may be implemented in the same node which implements the model 120 itself, or a different node. Training of the model 120 is implemented using training data, which may be acquired from control signalling 113 transmitted by the receiving wireless device 102. The probe 114 may obtain and forward the training data 118 to the model 120.

For example, in one embodiment, the control signalling 113 comprises RTCP traffic transmitted by the receiving wireless device 102 in respect of the media streams 107, 111. It was noted above that a number of wireless devices do not utilize RTCP; however, other wireless devices so use RTCP. According to embodiments of the disclosure, those wireless devices which do use RTCP may provide the training data by which the model 120 is trained. Those model 120 is then used to obtain the quality of media streams transmitted to wireless devices which do not use RTCP.

Figure 2:
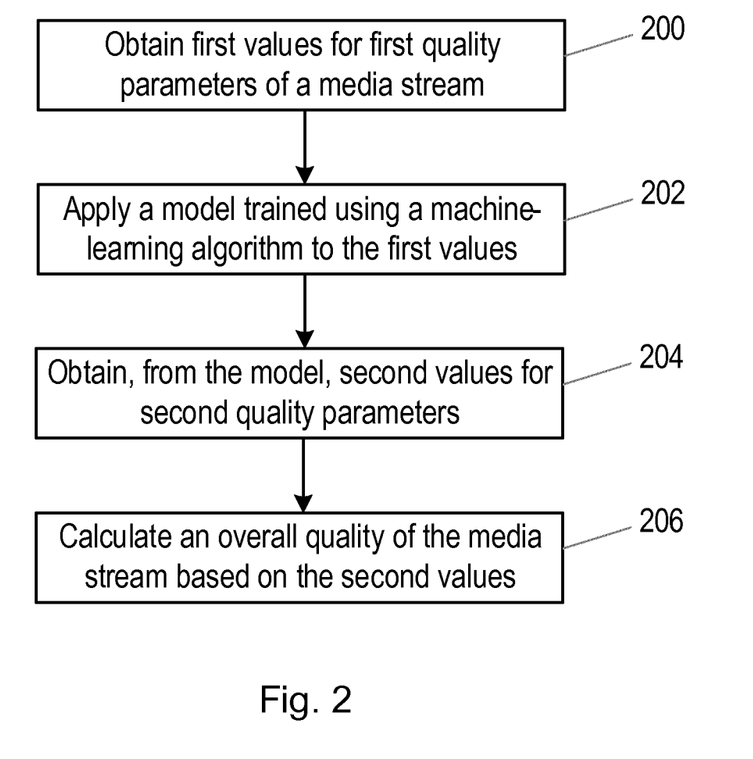
FIG. 2 is a flowchart of a method according to embodiments of the disclosure.
Figure 4:
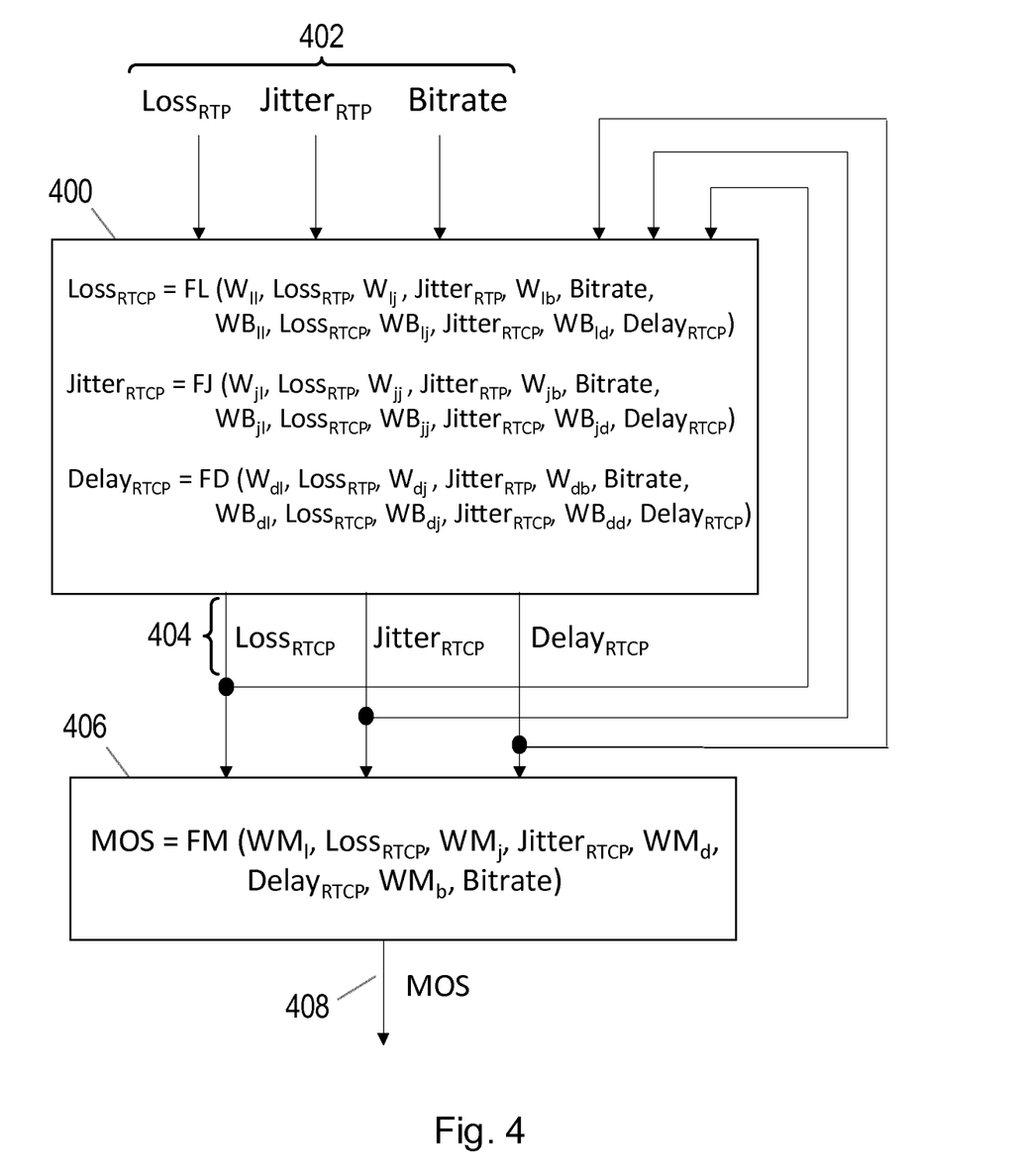
FIG. 4 is a schematic diagram showing a prediction model according to embodiments of the disclosure.

FIG. 2 is a flowchart of a method according to embodiments of the disclosure. The method may be performed by a node of a communication network, such as the communication network 100 described above with respect to FIG. 1. The node may implement a model trained using a machine-learning algorithm, such as the model 120 described above. Reference is also made to FIG. 4, which is a schematic diagram showing a prediction model according to embodiments of the disclosure.

The method provides a mechanism for determining the quality of a media stream transmitted from a sending device to a terminal device via at least a core network and a radio access network of the communication network. The media stream may relate to any media format, such as video or audio (e.g., voice). It will be understood that the method may be repeated for any number of media streams transmitted via the communication network.

The method begins in step 200, in which the node obtains first values for one or more first quality parameters of the media stream. The first values are measured by a core network node of the core network (such as the probe 114) monitoring the media stream prior to its transmission to the terminal device via the radio access network. Thus, where the node is implemented within the core network node itself, step 200 may comprise measuring the first quality parameters directly. Where the node is not implemented in the core network node, step 200 may comprise receiving the first values from the core network node.

The one or more first quality parameters may comprise the requested bitrate (i.e., the codec bitrate) of the media stream. The one or more first quality parameters may also comprise one or more of the jitter and the packet loss of the media stream. In particular, the jitter and packet loss may provide information on the transmission of the media stream from the media source 108, 112 to the core network 106 (and particularly to the core network node). However, such quantities do not provide information on the quality of the transmission over the downlink radio access network 104. While the requested bitrate is not a good indicator of the quality of experience at the receiving wireless device 102 on its own, it can provide information on the quality of the transmission via the downlink radio access network 104.

The core network node may measure the first values passively. For example, the core network node may capture packets from the media stream and generate reports from the captured packets comprising values for the one or more first quality parameters. In this way, each report (and each measured value) is based on a reporting period which may comprise multiple packets of the media stream. In one embodiment, a frequency with which the first values are obtained, or equivalently a length of the reporting period on which the measured values are based, varies as a function of changes in the adaptive bitrate of the medium stream (i.e. the requested bitrate under the adaptive bitrate streaming protocol).

That is, changes in the requested codec bitrate are usually the result of changing network conditions. In order to capture those changing network conditions accurately, the reporting period over which the values for the first quality parameters are measured may be shortened at or around changes in the codec bitrate. For example, the reporting period may be set to a default value (e.g., 5 seconds) during periods where the requested codec bitrate is stable or constant. At or near changes to the requested codec bitrate however, the reporting period may be set to a shorter value (e.g., 40 ms, 500 ms, 1 second, etc). The shorter reporting period may persist for a predetermined number of periods, before returning to the default value (either directly or gradually).

The change to the reporting period may also vary as a function of the magnitude of the change to the requested codec bitrate. Where the requested codec bitrate changes by a large value, the reporting period may correspondingly be reduced by a large factor; where the requested codec bitrate changes by a relatively small value, the reporting period may be reduced by a relatively small factor.

The reduction in the reporting period may occur before and/or after the change to the requested codec bitrate. If the reporting period is reduced prior to the change to the codec bitrate, this will require buffering of data samples; however, additional information will be obtained linking the measured parameters to the perceived quality. Conversely, reducing the reporting period after the change to the codec bitrate will lessen the buffer requirements, at the cost of reducing the accuracy of measured values in the time window leading up to the change in the codec bitrate.

In step 202, the node applies the model to the first values obtained in step 200. The first values may be provided directly as inputs to the model. However, in some embodiments, the first values may be subtracted from second values (which are output from the model, see below), such that the differences between the first and second values are provided as inputs to the model.

FIG. 4 shows the application of the first values 402 to the prediction model 400. The first values 402 are listed as the packet loss and the jitter, both as measured from RTP data, i.e., measurements of the media stream itself (and not the end-to-end data provided by RTCP), and the requested bitrate (i.e., the codec bitrate) of the media stream.

In step 204, the node obtains, output from the model, second values for one or more second quality parameters for the media stream. The second values are representative of the quality of the media stream at least as transmitted via the radio access network 104. In some embodiments, the second values are representative of the quality of the media stream between the media source and the receiving wireless device 102 (including the core network 106 and the first radio access network 104), i.e. the end-to-end quality.

The second quality parameters may include one or more of the first quality parameters. The second quality parameters may alternatively or additionally include one or more parameters not included in the first quality parameters. In one embodiment, for example, the second quality parameters comprise one or more of: jitter; packet loss; and delay. Jitter and packet loss may also be included as first quality parameters; however, it will be understood that the 41 s of those parameters are not representative of the quality of the media stream as it passes via the downlink radio access network 104, whereas the second values of those parameters are representative of the quality of the media stream as it passes via the downlink radio access network 104.

Returning to FIG. 4, it can be seen that the model 400 outputs second values 404 as described above. These second values 404 are additionally fed back as inputs to the model 400. The second values are listed as the packet loss, the jitter and the delay, all corresponding to RTCP data, i.e., values corresponding to the end-to-end data provided by RTCP.

The model 400 thus calculates the packet loss, the jitter and the delay, each as a function of the first values 402 and the second values 404 as follows:

$$Loss_{RTCP} = FL\begin{pmatrix} W_{ll}, Loss_{RTP}, W_{lj}, Jitter_{RTP}, W_{lb}, \text{Bitrate}, \\ WB_{ll}, Loss_{RTCP}, WB_{lj}, Jitter_{RTCP}, WB_{ld}, Delay_{RTCP} \end{pmatrix}$$

Where FL is the function by which the packet loss is calculated, $W_{ll}$ is the weighting for the packet loss as measured from RTP data, $W_{lj}$ is the weighting for the jitter as measured from RTP data, $W_{lb}$ is the weighting for the codec bitrate, $WB_{ll}$ is the weighting for the packet loss as calculated by the model 400 (and corresponding to RTCP data), $WB_{lj}$ is the weighting for the jitter as calculated by the model 400 (and corresponding to RTCP data), and $WB_{ld}$ is the weighting for the delay as calculated by the model 400 (and corresponding to RTCP data). Corresponding functions are used for the jitter and the delay, with different functions and respective weightings. The functions may be linear, quadratic or more complex.

In alternative embodiments, the second values 404 may be subtracted from the first values 404 (or vice versa) and the differences between the respective values used as inputs to the model 400.

In step 206, the node optionally calculates an overall quality of the media stream based on the second values obtained in step 204. The overall quality may be the mean opinion score (MOS) or another perceived quality of the media stream (or quality of experience). The overall quality may use any range of values: whereas the MOS traditionally uses a range of 1 (for lowest quality) to 5 (for highest quality), any other range may be used without departing from the scope of the claims appended hereto.

The overall quality may vary as a function of one or more additional parameters (i.e., in addition to the second values for the second quality parameters obtained in step 204). For example, in one embodiment the overall quality is also determined based on the codec bitrate of the media stream (which may be one of the parameters measured in step 200).

In one embodiment, the second values (and potentially the additional parameters) are provided as an input to one or more algorithms to calculate (or estimate) the overall quality. Various algorithms for estimating the MOS algorithmically based on the second quality parameters are known in the art. For example, in one embodiment, the second values are each multiplied by different weights in the calculation of the overall quality. These weights may be determined experimentally based on data samples for which the MOS is known (e.g., based on user input). In further embodiments, the weights may be determined by applying a machine-learning algorithm to such data samples.

FIG. 4 shows the estimation of the overall quality in the module 406, and the output of the MOS 408. In particular, the overall quality MOS is determined according to the following $$MOS=FM(WM_l,Loss_{RTCP},WM_j,Jitter_{RTCP},WM_d, Delay_{RTCP},WM_b,Bitrate)$$

Where FM is the function by which the MOS is calculated (which may be linear, quadratic, or higher complexity), $WM_l$ is the weighting for the packet loss as calculated by the model 400 (and corresponding to RTCP data), $WM_j$ is the weighting for the jitter as calculated by the model 400 (and corresponding to RTCP data), $WM_d$ is the weighting for the delay as calculated by the model 400 (and corresponding to RTCP data), and $WM_b$ is the weighting for the bitrate as obtained in step 200.

Figure 3:
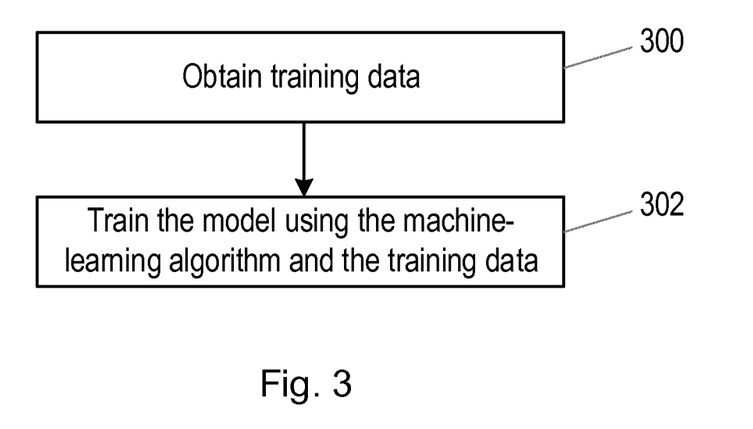
FIG. 3 is a flowchart of a method according to further embodiments of the disclosure.

Embodiments of the present disclosure thus provide a method for determining the quality of a media stream transmitted via a communication network, including at least the quality of the media stream as it is transmitted via a radio access network to a receiving device, based on data which is obtained prior to that transmission via the radio access network. The method relies upon a predictive model which is developed using a machine-learning algorithm. FIG. 3 below describes a method of training that model according to embodiments of the disclosure.

FIG. 3 is a flowchart of a method according to further embodiments of the disclosure. The method may be performed by a node of the communication network, such as the same node in which the model 120 is implemented. Alternatively, the method may be performed by a different node than that in which the model 120 is implemented.

The method begins in step 300, in which the node obtains training data. As noted above, the training data may comprise measured RTCP values for the second quality parameters, for those media streams where RTCP data 113 is available. In such embodiments, the training data additionally comprises corresponding values for the first quality parameters of the media streams, such that the functions mapping the first values for the first quality parameters to the second values for the second quality parameters can be determined. The training data may therefore be measured by the probe 114. Where the method of FIG. 3 is implemented within the probe 114 itself, step 300 thus comprises measuring the data directly; where the method of FIG. 3 is implemented in a different node, step 300 comprises receiving the training data directly or indirectly from the probe 114.

In step 302, the node trains the predictive model using a machine-learning algorithm, based on the training data obtained in step 300. In particular, the predictive model is trained by adjusting the weights ($W_u$, $W_{ij}$, etc) until the model adequately maps the first values for the first quality parameters to the second values for the second quality parameters. The machine-learning algorithm 122 may comprise gradient descent or other alternative algorithms (e.g. quasi-Newton, Levenberg-Marquardt, conjugate gradient, random forest, etc). During the training the measured RTCP loss, jitter and delay values are compared with the ones estimated by the model 400 and the coupling weights are adjusted to obtain closer estimations.

Figure 5:
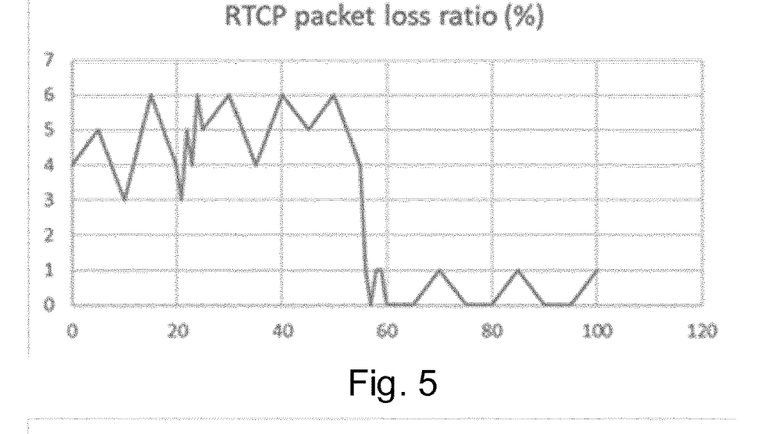
FIGS. 5 to 9 are graphs showing the variations of packet loss, jitter, delay, mean opinion score and codec bitrate, respectively, according to one example.
Figure 6:
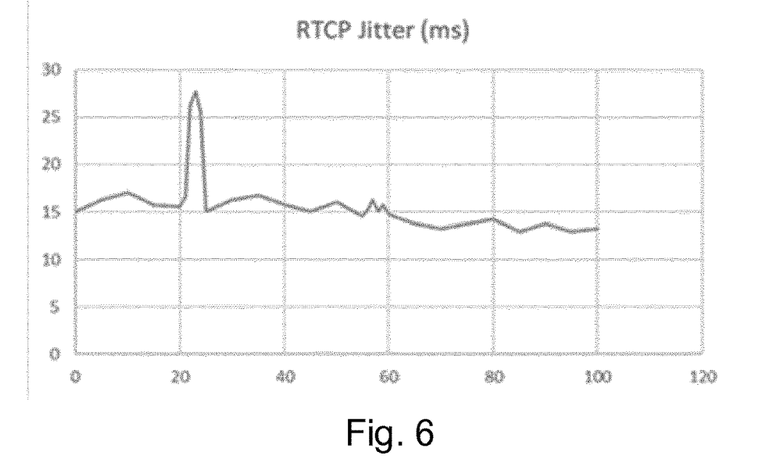
Figure 7:
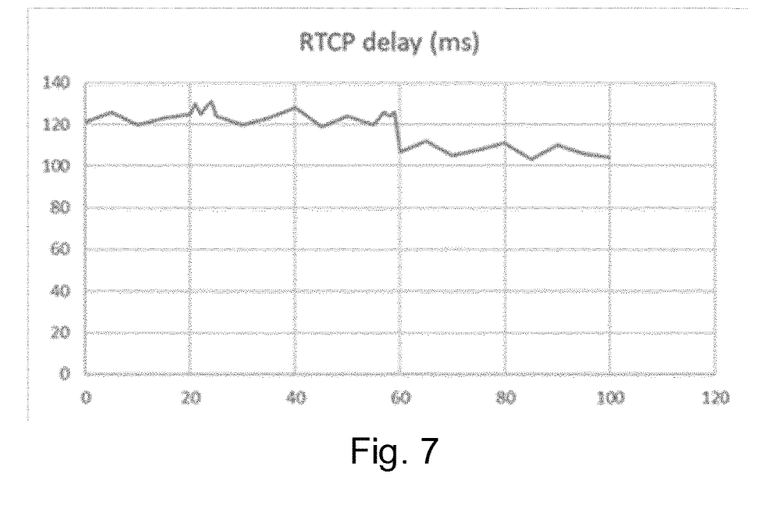
Figure 8:
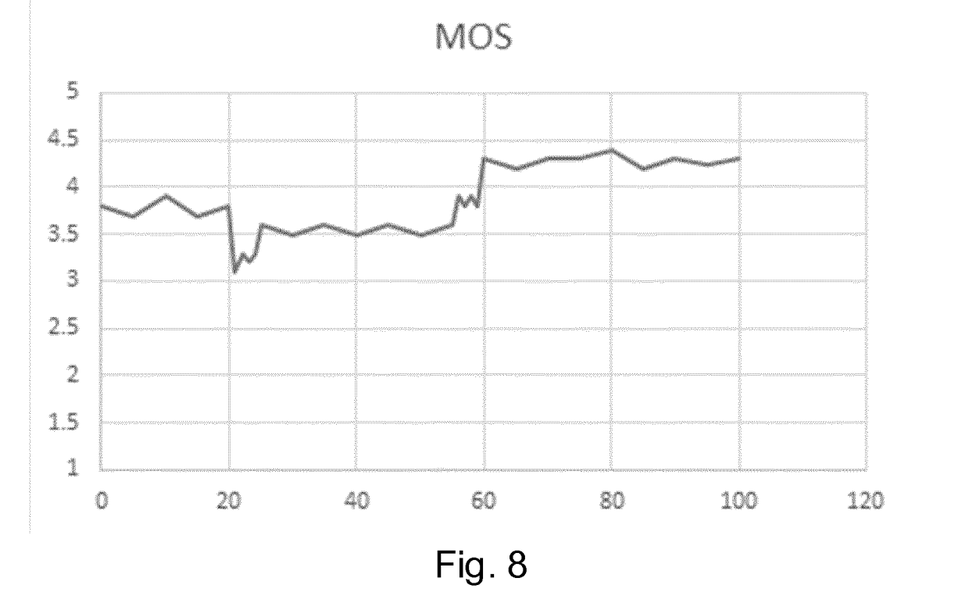
Figure 9:
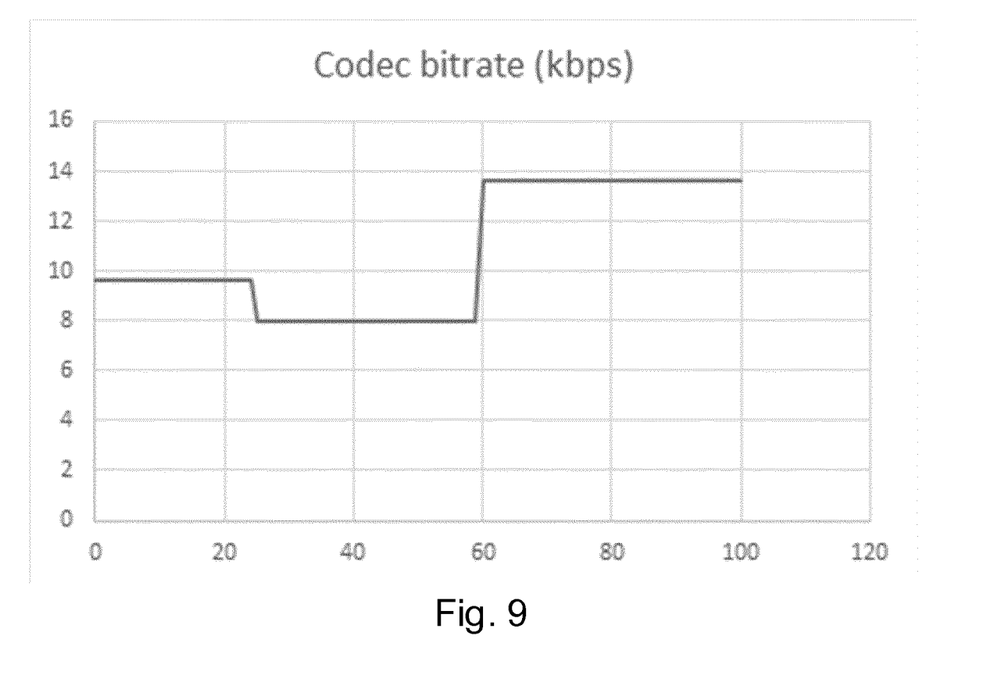

FIGS. 5 to 9 are graphs showing an example of the variations and correlation of various quality parameters according to embodiments of the disclosure. FIG. 5 shows the packet loss ratio over time for the example, as measured using RTCP (thus providing end-to-end information on the communication path of the media stream, including the radio access network by which the receiving wireless device receives the media stream); FIG. 6 shows the jitter in milliseconds as measured using RTCP over the same time window; FIG. 7 shows the delay in milliseconds as measured using RTCP; FIG. 8 shows the variation of mean opinion score (MOS); and FIG. 9 shows the codec bitrate (i.e. the requested bitrate).

In the illustrated example, the performance of the network is relatively poor, e.g. owing to interference in the downlink radio access network. This has two consequences for the monitored parameters of the training samples reported by the probe 114. First, there is some packet loss, with RTCP packet loss being about 4-5%. The signal to noise ratio in the traffic channel may be less than optimal, and therefore the receiving device selects a relatively low codec bitrate of 9.6 kbps. The low codec bitrate increases the reliability of the transmitted data and therefore the MOS is between 3.7 and 3.8, which is an acceptable quality.

After about 20 ms, for unknown reasons there is a further network degradation, causing high jitter. This causes the estimated MOS to drop to about 3. This is noticed by the receiving wireless device, which requests a lower bitrate of 8 kbps. The 8 kbps bitrate is even more robust to transmission errors, and therefore the MOS increases slightly to about 3.5.

At around t=55 ms, the radio conditions improve. The packet loss ratio drops to almost zero and, consequently, the MOS improves slightly to the level allowed by the relatively low bitrate of 8 kbps. After a short while, the receiving wireless device requests a higher bitrate of 13.2 kbps, which results in high MOS, above 4.

Particularly by comparing FIGS. 8 and 9, it can be seen that the codec bitrate is not a good indicator of perceived quality in the media stream. The drop in codec bitrate shortly after t=20 ms actually increases the perceived quality following the degradation in network conditions.

Figure 10:
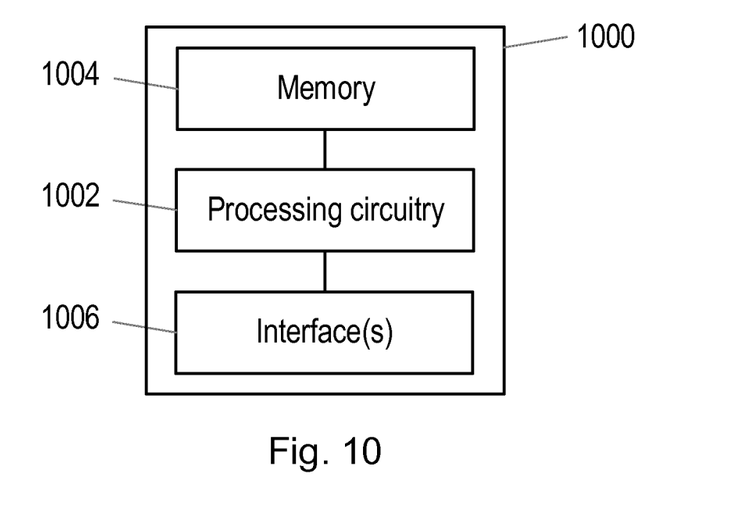
FIGS. 10 and 11 are schematic diagrams of a node according to embodiments of the disclosure.

FIG. 10 is a schematic diagram of a node 1000 according to embodiments of the disclosure. The node 1000 may be configured to perform the methods described above with respect to FIGS. 2 and/or 3. The node 1000 may be core network node or a server coupled to the core network of a communications network.

The node 1000 comprises processing circuitry 1002 (such as one or more processors, digital signal processors, general purpose processing units, etc), a machine-readable medium 1004 (e.g., memory such as read-only memory (ROM), random-access memory, cache memory, flash memory devices, optical storage devices, etc) and one or more interfaces 1006.

The node 1000 is operable in a communication network comprising a radio access network and a core network. According to embodiments of the disclosure, the machine-readable medium 1004 stores instructions which, when executed by the processing circuitry 1002, cause the node 1000 to: obtain first values for one or more first quality parameters of a media stream, the media stream being transmitted from a sending device to a terminal device via at least the core network and the radio access network, the first values being measured by a core network node of the core network monitoring the media stream prior to transmission of the media stream to the terminal device via the radio access network; apply a model trained using a machine-learning algorithm to the first values; and obtain, from the model, second values for one or more second quality parameters of the media stream, the second values being representative of the quality of the media stream at least as transmitted via the radio access network.

The one or more interfaces 1006 may comprise hardware and/or software suitable for communicating with other nodes of the communication network using any suitable communication medium. For example, the interfaces 106 may comprise one or more wired interfaces, using optical or electrical transmission mediums. Such interfaces may therefore utilize optical or electrical transmitters and receivers, as well as the necessary software to encode and decode signals transmitted via the interface. In a further example, the interfaces 106 may comprise one or more wireless interfaces. Such interfaces may therefore utilize one or more antennas, baseband circuitry, etc. The components are illustrated coupled together in series; however, those skilled in the art will appreciate that the components may be coupled together in any suitable manner (e.g., via a system bus or suchlike).

In further embodiments of the disclosure, the node 1000 may comprise power circuitry (not illustrated). The power circuitry may comprise, or be coupled to, power management circuitry and is configured to supply the components of node 1000 with power for performing the functionality described herein. Power circuitry may receive power from a power source. The power source and/or power circuitry may be configured to provide power to the various components of node 1000 in a form suitable for the respective components (e.g., at a voltage and current level needed for each respective component). The power source may either be included in, or external to, the power circuitry and/or the node 1000. For example, the node 1000 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 11:
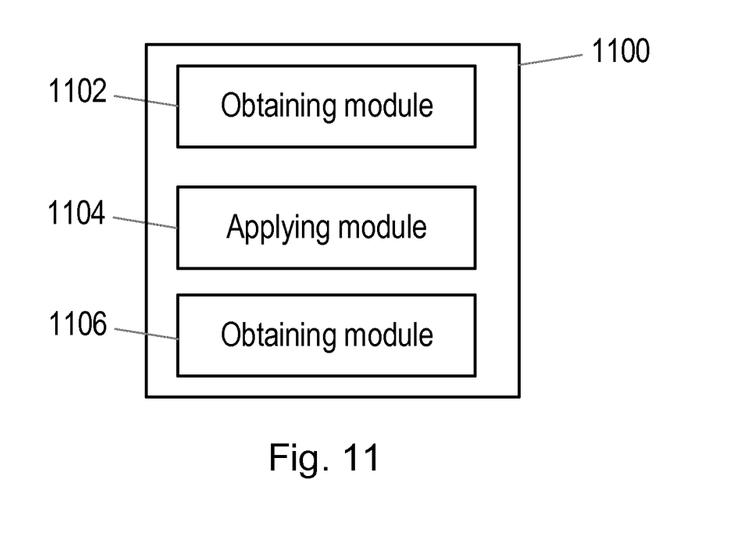

FIG. 11 is a schematic diagram of a node 1100 according to embodiments of the disclosure. The node 1100 may be configured to perform the methods described above with respect to FIGS. 2 and/or 3. The node 1000 may be core network node or a server coupled to the core network of a communications network.

The node 1100 comprises a first obtaining module 1102, an applying module 1104 and a second obtaining module 1106.

The node 1000 is operable in a communication network comprising a radio access network and a core network. According to embodiments of the disclosure, the first obtaining module 1102 is configured to obtain first values for one or more first quality parameters of a media stream, the media stream being transmitted from a sending device to a terminal device via at least the core network and the radio access network, the first values being measured by a core network node of the core network monitoring the media stream prior to transmission of the media stream to the terminal device via the radio access network. The applying module 1104 is configured to apply a model trained using a machine-learning algorithm to the first values. The second obtaining module 1106 is configured to obtain, from the model, second values for one or more second quality parameters of the media stream, the second values being representative of the quality of the media stream at least as transmitted via the radio access network.

The term "module" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments of the present disclosure thus provide a method for determining the quality of a media stream transmitted via a communication network, including at least the quality of the media stream as it is transmitted via a radio access network to a receiving device, based on data which is obtained prior to that transmission via the radio access network. The method utilizes a predictive model which is developed using a machine-learning algorithm.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The invention claimed is:

1. A method performed by a node of a communications network, for monitoring a quality of one or more media streams transmitted over the communications network, the communications network comprising a radio access network and a core network, the method comprising:

obtaining first values for one or more first quality parameters of a media stream, the media stream being transmitted from a sending device to a terminal device via at least the core network and the radio access network, the first values being measured by a core network node of the core network monitoring the media stream prior to transmission of the media stream to the terminal device via the radio access network, wherein a frequency with which the first values are obtained varies as a function of chances among adaptive codec bitrates of the media stream from one codec bitrate to another;
applying a model trained using a machine-learning algorithm to the first values; and
obtaining, from the model, second values for one or more second quality parameters of the media stream, the second values being representative of the quality of the media stream at least as transmitted via the radio access network.

2. The method according to claim 1, wherein the second values are representative of an end-to-end quality of the media stream between the sending device and the terminal device.

3. The method according to claim 1, wherein the first values are representative of the quality of the media stream between the sending device and the core network node.

4. The method according to claim 1, wherein the one or more first quality parameters comprise a codec bitrate.

5. A node for a communications network, configured to monitor a quality of one or more media streams transmitted over the communication network, the communications network comprising a radio access network and a core network, the node comprising processing circuitry and a computer-readable medium comprising instructions which, when executed by the processing circuitry, cause the node to:
obtain first values for one or more first quality parameters of a media stream, the media stream being transmitted from a sending device to a terminal device via at least the core network and the radio access network, the first values being measured by a core network node of the core network monitoring the media stream prior to transmission of the media stream to the terminal device via the radio access network, wherein a frequency with which the first values are obtained varies as a function of changes among adaptive codec bitrates of the media stream from one codec bitrate to another;
apply a model trained using a machine-learning algorithm to the first values; and
obtain, from the model, second values for one or more second quality parameters of the media stream, the second values being representative of the quality of the media stream at least as transmitted via the radio access network.

6. The node according to claim 5, wherein the second values are representative of an end-to-end quality of the media stream between the sending device and the terminal device.

7. The node according to claim 5, wherein the first values are representative of the quality of the media stream between the sending device and the core network node.

8. The node according to claim 5, wherein the one or more first quality parameters comprise a codec bitrate.

9. The node according to claim 5, wherein the one or more first quality parameters comprise one or more of: jitter and packet loss.

10. The node according to claim 5, wherein the one or more second quality parameters comprise one or more of: jitter, packet loss and delay.

11. The node according to claim 5, wherein the node is further caused to:
obtain training data comprising training values for the one or more first quality parameters and corresponding training values for the one or more second quality parameters, the training values for the one or more first quality parameters and the one or more second quality parameters being measured by the core network node monitoring reporting messages from the terminal device in respect of the media stream; and
train the model using the machine-learning algorithm based on the training data.

12. The node according to claim 11, wherein the reporting messages are configured according to a real-time transport control protocol, RTCP.

13. The node according to claim 5, wherein inputs to the model are based on the first values and the second values.

14. The node according to claim 13, wherein the inputs to the model are based on the first values and the second values such that the model operates on a difference between the first and second values.

15. The node according to claim 5, wherein the frequency increases as the codec bitrate of the media stream changes.

16. The node according to claim 5, wherein the media stream utilizes a transport-layer protocol which does not comprise a mechanism for retransmitting erroneous or missing data packets.

17. The node according to claim 5, wherein the media stream utilizes real-time transport protocol, RTP.

18. The node according to claim 5, wherein the sending device is one of: a wireless device; and a media source node.

19. A non-transitory computer-readable medium comprising instructions which, when executed by processing circuitry of a node, cause the node to:
obtain first values for one or more first quality parameters of a media stream, the media stream being transmitted from a sending device to a terminal device via at least a core network and a radio access network, the first values being measured by a core network node of the core network monitoring the media stream prior to transmission of the media stream to the terminal device via the radio access network, wherein a frequency with which the first values are obtained varies as a function of chances among adaptive codec bitrates of the media stream from one codec bitrate to another;
apply a model trained using a machine-learning algorithm to the first values; and
obtain, from the model, second values for one or more second quality parameters of the media stream, the second values being representative of a quality of the media stream at least as transmitted via the radio access network.

* * * * *